(12) United States Patent
Fried

(10) Patent No.: US 6,672,501 B2
(45) Date of Patent: Jan. 6, 2004

(54) METHOD FOR REPAIRING DAMAGED AREAS IN A METAL COMPONENT

(75) Inventor: Reinhard Fried, Nussbaumen (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/006,700

(22) Filed: Dec. 10, 2001

(65) Prior Publication Data

US 2002/0100793 A1 Aug. 1, 2002

(30) Foreign Application Priority Data

Dec. 27, 2000 (DE) .......................... 100 65 406

(51) Int. Cl.[7] .............. B23K 31/02; B23P 6/00
(52) U.S. Cl. .............. 228/119; 228/248.1; 29/889.1
(58) Field of Search ................. 228/119, 256, 228/254, 248.1, 248.5; 29/889.1–889.722

(56) References Cited

U.S. PATENT DOCUMENTS

| | | | |
|---|---|---|---|
| 4,381,944 A | | 5/1983 | Smith, Jr. et al. |
| 4,655,383 A | * | 4/1987 | Fournes et al. ............ 228/119 |
| 4,910,098 A | * | 3/1990 | Lee et al. ............ 228/262.31 |
| 5,040,718 A | * | 8/1991 | Lee et al. ............ 228/119 |
| 5,334,344 A | | 8/1994 | Hegner et al. |
| 5,437,737 A | * | 8/1995 | Draghi et al. ............ 148/22 |
| 5,873,703 A | * | 2/1999 | Kelly et al. ............ 228/119 |
| 5,902,421 A | * | 5/1999 | Christy ............ 148/428 |
| 5,916,518 A | * | 6/1999 | Chesnes ............ 148/408 |
| 6,027,584 A | * | 2/2000 | Jackson et al. ............ 148/427 |
| 6,190,467 B1 | * | 2/2001 | Jackson et al. ............ 148/426 |
| 6,195,864 B1 | * | 3/2001 | Chesnes ............ 148/425 |
| 6,367,686 B1 | * | 4/2002 | Abriles et al. ............ 148/23 |
| 2001/0025417 A1 | * | 10/2001 | Fried et al. |
| 2002/0100793 A1 | * | 8/2002 | Fried |

FOREIGN PATENT DOCUMENTS

| | | |
|---|---|---|
| DE | 32 37 776 C2 | 4/1983 |
| DE | 41 05 596 C2 | 8/1992 |
| DE | 689 08 980 T2 | 1/1994 |
| DE | 44 11 680 C1 | 8/1995 |
| DE | 697 02 416 T2 | 3/2001 |
| DE | 100 00 989 A1 | 7/2001 |
| EP | 1 029 629 A2 | 8/2000 |
| EP | 1 055 480 A2 | 11/2000 |

OTHER PUBLICATIONS

Patent Abstracts of Japan, Publication No. 62118004 A, May 29, 1987.

* cited by examiner

*Primary Examiner*—Kiley Stoner
(74) *Attorney, Agent, or Firm*—Burns, Doane, Swecker & Mathis, L.L.P.

(57) ABSTRACT

The invention relates to a method for repairing a superficial damaged area in a metal component formed as a result of a loss of material, whereby the damaged area is filled by way of a high-temperature soldering process. In order to improve the durability of the filling, an active solder is used during the high-temperature soldering process.

8 Claims, 1 Drawing Sheet

METHOD FOR REPAIRING DAMAGED AREAS IN A METAL COMPONENT

FIELD OF THE INVENTION

The invention relates to a method for repairing superficial damaged areas in a metal component, created by a loss of material.

BACKGROUND OF THE INVENTION

Metal components, such as, for example, the blades or other components of a turbo-machine, in particular a turbine or compressor, may be subject to high stresses due to oxidation and/or corrosion and/or erosion and/or abrasion. In particular in turbine blades, these stresses may result locally in losses or abrasion of material at the surface of the blades, causing damaged areas, in particular in the form of relatively large recesses or holes, to form. Because of high prices for such blades, efforts are made to repair these damaged areas in the blades, in order to restore on the one hand their strength and on the other hand their flow quality. One possibility for repairing the damaged areas or the component consists of filling the damaged areas by using a high temperature soldering process. In a conventional process, a standard metal solder is used for the high-temperature soldering, which metal solder wets a metallic surface and then forms a diffusion bond with the metallic surface during soldering. To fill relatively large damaged areas, so-called "wide gap" solder is used. These are metal solders mixed with metal filler, whereby this metal filler preferably has similar properties as the metal of the metal component.

In particular as a result of the oxidative and corrosive stress on a metal component, non-metallic reaction products, such as, for example, oxides or nitrides, may form at the damaged areas. Since a standard metal solder is unable to wet non-metallic surfaces and is also unable to form a diffusion bond with them, these non-metallic reaction products are cleaned from the damaged areas to be filled, for example by grinding or sandblasting. It was found, however, that the fillings applied by a conventional high-temperature soldering process, in particular in the case of highly stressed turbine blades, in some cases does not possess satisfactory durability, so that even after a relatively short service life damaged areas may reoccur in the repaired area.

U.S. Pat. No. 5,334,344 discloses a method for soldering a ceramic part, a monocrystal, and a metal part to a monocrystal, or of a ceramic part to a monocrystal, or of a monocrystal to a metal part, whereby an active solder is used to produce the soldering bond. "Active solder" means an alloy that contains at least one element, such as, for example, titanium, that has an affinity for non-metals, for example, oxygen, nitrogen, so that no flux is necessary during the soldering process. An active solder therefore possesses the property of being able to wet both metallic and non-metallic surfaces and being able to form a reaction bond during soldering with a non-metallic surface, and a diffusion bond during soldering with a metallic surface.

SUMMARY OF THE INVENTION

The invention at hand has the objective of designing a method of the initially mentioned type in such a way that a repair performed according to this method has an improved durability.

According to the invention, this objective is realized in a method of the initially mentioned type in that an active solder is used in a high-temperature soldering process employed to fill the damaged areas.

In one aspect of the invention, there is provided a method for repairing a superficial damaged area in a metal component formed as a result of a loss of material. In a first embodiment, the method fills the damaged area by way of a high-temperature soldering process using an active solder.

In another embodiment, the method mixes a metal filler with the active solder. In an additional embodiment, the active solder is applied as a layer to the damaged area, and a conventional metal solder is applied to the active solder layer. In a further embodiment, the a conventional metal solder is mixed with the active solder. In yet an additional embodiment, the active solder is formed at or in the damaged area by first applying an active metal and a conventional metal solder to the damaged area. In a still further embodiment, a metal filler is mixed with the metal solder.

BRIEF DESCRIPTION OF THE DRAWINGS

A preferred embodiment of the invention is disclosed in the following description and illustrated in the accompanying drawing, in which.

DETAILED DESCRIPTION OF THE INVENTION

Figure 1:
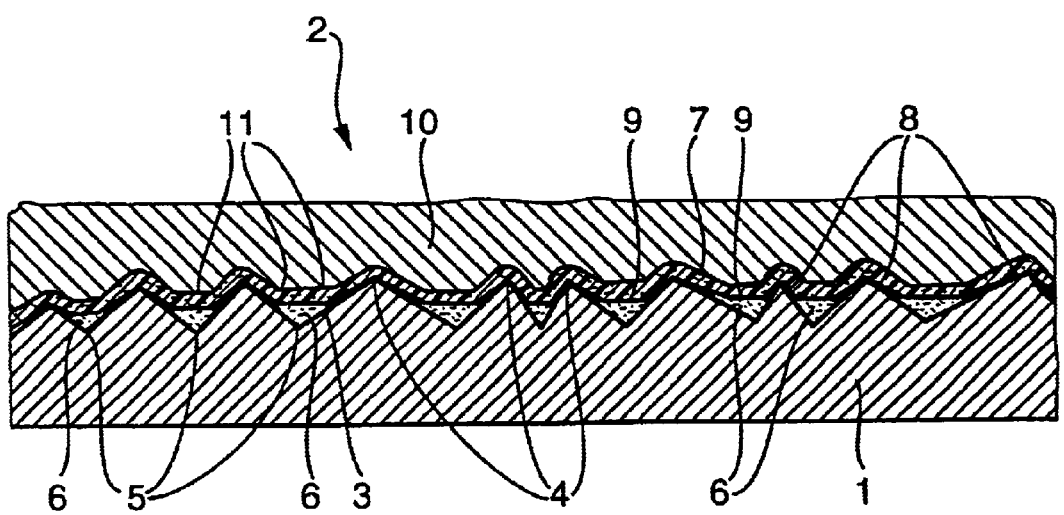
FIG. 1 shows a section through a metal component in the area of a damaged area.

The invention uses the properties of an active solder, which properties are principally known for producing a soldering bond between two components, in order to fill a damaged area during a repair of a metal component. These considerations are based on the understanding that it is often not possible during a repair to completely clean the damaged areas of non-metallic reaction products, for example oxides. The residues of non-metallic surfaces remaining in the respective damaged area are not wetted with a conventional metal solder during the high-temperature soldering process, so that a diffusion bond is not formed between the metal component and the filling in these surface sections. These defects or weak points in the bond between the filling and the metal component reduce the durability of the filling, and therefore of the repair. Studies found that the non-metallic reaction products also remain in the deep, hardly accessible rough spots of the surface of the respective damaged area, which has been roughened because of corrosion, oxidation, erosion or abrasion, even after a conventional, mechanical cleaning process. It was also found that the non-metallic reaction products, which are harmful for the wetting and soldering bond, also form almost autonomously on an actually completely cleaned, smooth, level surface if this surface is unprotected. This may happen, for example, when the component is heated during the cleaning process; it may also happen during the heating that occurs during the soldering process if the existing furnace atmosphere is not sufficiently monitored, for example with respect to vacuum or gassing.

By using an active solder when repairing damaged areas in a metal component, the active solder in the damaged area achieves a diffusion bond in areas with a metallic surface, and forms reaction bonds in areas with non-metallic surface, i.e. in areas of interfering reaction products. Accordingly, the active solder has a strong bond both with the metallic surfaces as well as with the non-metallic surfaces. The active solder wets both metallic as well as non-metallic surfaces in the same way so that a gapless application of the active solder can be easily achieved. This results in a high-quality filling with high durability.

It is hereby principally possible to make the entire filling with the active solder. Preferably, a metal filler can be mixed with the active solder in order to influence, for example, the flux properties of this active solder in a suitable manner. In the same way, a metal filler is able to influence the thermal properties as well as strength characteristics of the filling in a desired manner.

In another embodiment, the active solder can be mixed into a conventional metal solder. The enrichment of the metal solder with the active solder quasi-activates the metal solder so that it is able to wet the non-metallic surfaces of the reaction products and is able to form reaction bonds with them.

However, an embodiment is preferred in which a layer of active solder is applied to the damaged areas, whereby a layer of a conventional metal solder is applied onto this active solder layer. This layered application of active solder and metal solder hereby can be performed consecutively or almost simultaneously. This procedure results in an overall coating with a high concentration of active solder on the surface of the damaged areas, whereby the active solder blends into the metal solder with increasing distance from the surface of the damaged area.

According to a further development of the process, the active solder layer and metal solder layer can be soldered in a single soldering cycle. A "soldering cycle" hereby means a process in which the solder melts and forms the desired diffusion or reaction bonds. The soldering of the active solder layer and metal solder layer in a single soldering cycle results, for example, in a time advantage.

In an alternative further development, the active solder layer can be soldered prior to the application of the metal solder layer in a first soldering cycle, while the metal solder layer is soldered after the application of the metal solder layer in a second soldering cycle. In this process, the individual soldering cycles can be optimized with respect to their parameters for the respective soldering layer; the parameters affected by this are, for example: temperature, pressure, time, vacuum quality.

According to a preferred embodiment, the active solder and the metal solder in each case can be formed as a paste, whereby the active solder paste has a low viscosity in relation to the metal solder paste. This measure enables the active solder paste to better penetrate into recesses that have formed in the respective damaged area due to surface roughness present there. The active solder in this way is also able to better adapt to the surface structure in the damaged area.

In a still further embodiment, the active solder can be formed on or in the respective damaged area by first applying an active metal, for example in powder or granulate form, onto the respective damaged area, and then applying a conventional metal solder. Because of this measure, the active metal is mixed locally with the metal solder applied to the damaged area, so that an active solder area forms directly on the surface of the damaged area in the metal solder. The active solder is therefore provided exactly at the point where it is required in order to achieve the desired reaction bonds. Active metals are, for example, titanium (Ti), hafnium (Hf), zirconium (Zr). The active metal can be applied, for example, by brushing or blasting.

According to FIG. 1, a metal component 1, which, for example, may be a blade of a turbine, has on its surface a damaged area 2 created by a loss of material, which may be produced, for example, during the use of the component 1 as a result of an oxidative and/or corrosive and/or erosive and/or abrasive environment. In the area of the damaged area 2, this creates a surface 3 with a relatively high degree of roughness, which is indicated in FIG. 1 in a simplified manner by peaks 4 and valleys 5.

A correspondingly aggressive environment may cause non-metallic reaction products, for example oxides, to form in the area of the damaged area 2 on the surface 3 of the metal component 1. If the damaged area 2 is supposed to be repaired, it is cleaned beforehand, for example mechanically by sandblasting and/or brushing. Hereby a large part of the non-metallic reaction products is removed from the surface 3 of the metal component 1. This cleaning of the surface 3 is regularly incomplete, so that especially in the valleys 5 of the rough surface 3, residues of the non-metallic reaction products remain. In FIG. 1, the non-metallic reaction products remaining after the cleaning process are designated with the numeral 6.

According to FIG. 1, the surface 3 of the metal component 1 is adjoined by an active solder 7 that, after soldering in the areas of the peaks 4, forms diffusion bonds 8 with the metallic surface of the metal component 1 present there. In contrast to this, the active solder 7 forms, in the areas of the valleys 5, reaction bonds 9 with the non-metallic surfaces of the reaction products 6. Accordingly, the active solder 7 has a highly stable bond with both the non-metallic reaction products 6, as well as the metallic surface 3 of the metal component I after soldering. Since the non-metallic reaction products 6 on their part are connected via reaction bonds with the metallic surface 3 of the metal component 1, a gapless, intensive bond with the metal component 1 is obtained for the active solder 7.

The active solder 7 is adjoined by a conventional metal solder 10 that, after soldering, has formed a diffusion bond 11 with the metallic surface of the active solder 7 adjoining it. Accordingly, there is also a highly stable bond of the metal solder 10 with the active solder 7. It is hereby remarkable that, on the one hand, the active solder 7 wets both the metallic surface sections of the metal component 1, as well as the non-metallic surface sections of the reaction products 6, so that essentially a closed wetting is obtained in the area of the damaged area 2. On the other hand, this has the result that the applied active solder 7 has a closed metallic surface that can be completely wetted with the metal solder 10. To this extent, a high-quality filling of the damaged area 2 is achieved. In contrast to FIG. 1, usually no border between the active solder 7 and the metal solder 10 is visible any longer after soldering because of the diffusion bonds 11.

A special embodiment of the repair process according to the invention can be performed as follows:

First, the surface 3 is cleaned in the area of the damaged areas 2. Hereby residues of the non-metallic reaction products 6 missed by the cleaning are left behind, especially in the valleys 5, or form there due to the heating during the cleaning. Then a layer of active solder 7 is applied in the area of the damaged areas 2. The active solder 7 hereby can be present as a relatively low-viscosity paste that easily penetrates into the valleys 5 of the surface roughness. Because of its special property, the active solder 7 hereby wets both the metallic surfaces as well as the non-metallic surfaces occurring in the damaged area 2. To this extent, a gapless wetting of the surface 3 in the damaged area 2 can be realized with the active solder 7.

After applying the active solder layer, a first soldering cycle can be run, during which the metal component 1 is heated together with the applied active solder layer. As a result of this soldering process, the diffusion bonds 8 and reaction bonds 9 form, so that the active solder 7 now forms the surface in the damaged area 2.

The following can be used, for example, as an active solder 7: AM900, AuPdTi, AuNiTi, PdNiTi, AuTi, CuSiAlTi, AgCuInTi, AgCuHf, AgCuTi, NiZrTi, NiTi. The thickness of the applied active solder layer may be, for example, 10 $\mu$m.

After the first soldering cycle, the metal solder 10 is applied, for example, in the form of a relatively viscous paste to the active solder layer that has been soldered on or presoldered. The metal solder 10 hereby can easily wet the metallic surface of the active solder layer. Then a second soldering cycle is run, during which the metal component 1 and the solder layers again are heated. As a result of this soldering process, the diffusion bonds 11 are now able to form between the active solder 7 and metal solder 10.

The active metal of the respective active solder 7 reacts with the non-metallic reaction product 6, for example with an oxide. Hereby a reaction layer with a metallic surface that can also be wetted with a conventional metal solder 10 forms. A wettable reaction layer may be 1 to 5 $\mu$m thick. The metal solder 10, for example, may be a wide gap solder that contains a metal filler. The metal solder 10 is able to spread without any gaps on the completely clean and wettable surface formed by the soldered active solder 7. This gapless distribution of the metal solder 10 results in a significant quality improvement of the filling that was applied by the high-temperature soldering process in order to repair the damaged area 2.

During the soldering cycles, the metal component 1 and the respective solder 7, 10 are heated, for example, to approximately 1,000° C., so that the process is a high-temperature soldering process.

After the second soldering cycle, a tension baking cycle may be performed, during which tensions created by the soldering cycles are reduced. Then, in particular, the surface of the metal solder 10 can be finished in order to adapt, for example, the surface of the repaired location to the original contour of the metal component 1.

What is claimed is:

1. Method for repairing a superficial damaged area in a metal component formed as a result of a loss of material, the method comprising:

filling the damaged area by way of a high-temperature soldering process, wherein an active solder is used during the high-temperature soldering process, wherein the active solder is applied as a layer to the damaged area, and the method further comprises applying a conventional metal solder to said active solder layer.

2. Method according to claim 1, wherein the active solder layer and the metal solder layer are soldered together in a single soldering cycle.

3. Method according to claim 1, wherein the active solder layer is soldered prior to the application of the metal solder layer in a first soldering cycle, and the metal solder layer is soldered after the application of the metal solder layer in a second soldering cycle.

4. Method according to claim 1, wherein the active solder and the metal solder each are realized as a paste, the active solder paste having a lower viscosity in relation to the metal solder paste.

5. Method according to claim 1, wherein the metal component is part of a turbo-machine.

6. Method according to claim 5, wherein the turbo-machine is a turbine or compressor.

7. Method according to claim 5, wherein the metal component is a blade of the turbo-machine.

8. Method according to claim 1, further comprising mixing a metal filler with the metal solder.

* * * * *